(12) United States Patent
Shen et al.

(10) Patent No.: US 10,042,961 B2
(45) Date of Patent: Aug. 7, 2018

(54) RELEVANCE GROUP SUGGESTIONS

(71) Applicant: Microsoft Technology Licensing, LLC, Redmond, WA (US)

(72) Inventors: Yelong Shen, Bothell, WA (US); Xinying Song, Bellevue, WA (US); Jianfeng Gao, Woodinville, WA (US); Chenlei Guo, Redmond, WA (US); Byungki Byun, Issaquah, WA (US); Ye-Yi Wang, Redmond, WA (US); Brian D. Remick, Morgan Hill, CA (US); Edward Thiele, Mountain View, CA (US); Mohammed Aatif Ali, Union City, CA (US); Marcus Gois, San Jose, CA (US); Yang Zou, Mountain View, CA (US); Mariana Stepp, Santa Clara, CA (US); Divya Jetley, Bellevue, WA (US); Stephen Friesen, Dublin, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 376 days.

(21) Appl. No.: 14/811,397

(22) Filed: Jul. 28, 2015

(65) Prior Publication Data
US 2016/0321283 A1 Nov. 3, 2016

Related U.S. Application Data

(60) Provisional application No. 62/154,039, filed on Apr. 28, 2015, provisional application No. 62/156,362, filed on May 4, 2015.

(51) Int. Cl.
*G06F 17/30* (2006.01)
*G06Q 10/06* (2012.01)
*H04L 12/58* (2006.01)

(52) U.S. Cl.
CPC ...... *G06F 17/3097* (2013.01); *G06F 17/3053* (2013.01); *G06F 17/30598* (2013.01);
(Continued)

(58) Field of Classification Search
CPC .......... G06F 17/30699; G06F 17/3097; G06F 17/3053; G06F 17/30598
(Continued)

(56) References Cited

U.S. PATENT DOCUMENTS 7,774,421 B2 8/2010 Dubovsky et al.
8,090,781 B2 1/2012 Sano
(Continued)

OTHER PUBLICATIONS

"Second Written Opinion Issued in PCT Application No. PCT/US2016/029408", dated Mar. 16, 2017, 7 Pages.
(Continued)

*Primary Examiner* — Phong H Nguyen
(74) *Attorney, Agent, or Firm* — Law Offices of Richard Chi; Richard Chi

(57) ABSTRACT

Techniques for providing a people recommendation system for predicting and recommending relevant people (or other entities) to include in a conversation. In an exemplary embodiment, a plurality of conversation boxes associated with communications between a user and target recipients, or between other users and recipients, are collected and stored as user history. During a training phase, the user history is used to train encoder and decoder blocks in a de-noising auto-encoder model. During a prediction phase, the trained encoder and decoder are used to predict one or more recipients for a current conversation box composed by the user, based on contextual and other signals extracted from the current conversation box. The predicted recipients are ranked using a scoring function, and the top-ranked individuals or entities may be recommended to the user.

16 Claims, 10 Drawing Sheets

(52) U.S. Cl.
CPC . *G06F 17/30699* (2013.01); *G06Q 10/06311* (2013.01); *G06Q 10/06313* (2013.01); *G06Q 10/06315* (2013.01); *H04L 51/04* (2013.01)

(58) Field of Classification Search
USPC .................................................. 707/728, 737
See application file for complete search history.

(56) References Cited

U.S. PATENT DOCUMENTS

| | | | | |
|---|---|---|---|---|
| 8,301,704 | B2* | 10/2012 | Gross | H04L 51/28 709/201 |
| 8,306,809 | B2 | 11/2012 | Hammer et al. | |
| 8,489,626 | B2 | 7/2013 | Li et al. | |
| 8,677,251 | B2 | 3/2014 | Kwok et al. | |
| 8,738,634 | B1* | 5/2014 | Roth | G06F 17/30867 707/748 |
| 8,892,672 | B1 | 11/2014 | Rackliffe | |
| 8,990,191 | B1* | 3/2015 | Liu | G06F 17/30598 705/14.45 |
| 9,594,851 | B1* | 3/2017 | Chechik | G06F 17/3097 |
| 2007/0130368 | A1 | 6/2007 | Martin et al. | |
| 2009/0037413 | A1 | 2/2009 | Castell et al. | |
| 2009/0100183 | A1 | 4/2009 | Lam et al. | |
| 2009/0282039 | A1* | 11/2009 | Diamond | G06F 17/30985 707/E17.014 |
| 2012/0183935 | A1* | 7/2012 | Hamada | G06F 17/2755 434/167 |
| 2013/0204809 | A1* | 8/2013 | Bilenko | G06N 99/005 706/12 |
| 2014/0214976 | A1 | 7/2014 | Zhou et al. | |
| 2014/0222815 | A1* | 8/2014 | Roth | G06F 17/30867 707/736 |
| 2015/0112182 | A1* | 4/2015 | Sharma | A61B 5/0261 600/408 |
| 2016/0048741 | A1* | 2/2016 | Nguyen | G06K 9/6256 382/159 |
| 2016/0098633 | A1* | 4/2016 | Min | G06N 3/08 706/25 |
| 2016/0106321 | A1* | 4/2016 | Sharma | A61B 5/0261 600/407 |
| 2016/0189730 | A1* | 6/2016 | Du | G10L 21/0272 704/233 |
| 2016/0283859 | A1* | 9/2016 | Fenoglio | H04L 41/16 |

OTHER PUBLICATIONS

Carvalho, et al., "Recommending Recipients in the Enron Email Corpus", In Technical Report CMU-LTI-07-005, Jun. 7, 2010, 10 pages.

Gomzin, et al., "Recipient Suggestion for Electronic Messages Using Local Social Network Data", In Proceedings of Tenth Spring Researchers Colloquium on Databases and Information Systems, Nov. 2014, 7 pages.

Guo, et al., "GroupMe: Supporting Group Formation with Mobile Sensing and Social Graph Mining", In Proceedings of 9th International Conference on Mobile and Ubiquitous Systems: Computing, Networking and Services, Dec. 12, 2012, 12 pages.

MacLean, et al., "Groups Without Tears: Mining Social Topologies from Email", In Proceedings of 16th International Conference on Intelligent User Interfaces, Feb. 13, 2011, pp. 83-92.

"International Search Report and Written Opinion Issued in PCT Application No. PCT/US2016/029408", dated Jun. 21, 2016, 11 Pages.

\* cited by examiner

110 — From: John Smith
112 — To: Bob Jones; Dave Lee
114 — Re: 2015 summer marketing campaign
116 — Date: May 1, 2014 12:01 PM 120 — Let's set up a time to review the new marketing campaign.

FIG 1

RELEVANCE GROUP SUGGESTIONS

CROSS-REFERENCE TO RELATED APPLICATIONS

This application claims the benefit of U.S. Provisional Application No. 62/154,039, filed Apr. 28, 2015, and U.S. Provisional Application No. 62/156,362, filed May 4, 2015, the disclosures of which are hereby incorporated by reference.

BACKGROUND

Widespread communications applications like email, document sharing, and social networking allow more and more people to be connected. As users' contacts lists grow ever larger, it becomes more difficult to determine the most relevant people to receive a message or join in a conversation. Existing software applications may make people recommendations for recipients to include in a user-created conversation. However, such applications may only take into account basic signals, such as the first letters of a user-input name, or most frequently messaged contacts, etc.

It would be desirable to provide a system that learns user preferences for people to include in a message or conversation, based on the content and context of prior user communications. For example, when composing an email related to a specific business project, a user could be provided with recommendations of people who have previously communicated with the user regarding the business project. Similarly, when browsing posts or updates on a social network, a user could be provided with recommendations of people to add as contacts.

Accordingly, techniques are desired for utilizing prior user communications to identify people most relevant to certain contextual signals contained therein, and leverage such signals to generate people recommendations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for generating people recommendations based on contextual features of a user-created item. In certain aspects, records of prior user communications are structured into a plurality of conversation boxes containing associated contextual features. During a training phase, the conversation boxes are used to train a prediction algorithm, such as a de-noising auto-encoder model, to derive optimal weights for assigning a recommended group of participants to a set of contextual features. During a prediction phase, the prediction algorithm functions to recommend a group of participants for a current conversation box. A scoring function may be used to identify a top-ranked participant. In a further aspect, techniques are provided for feedback adjustment of the prediction algorithm based on user acceptance or rejection of system-generated recommendations.

Other advantages may become apparent from the following detailed description and drawings.

BRIEF DESCRIPTION OF THE DRAWINGS

FIG. 1 illustrates an exemplary user interface for an email client software illustrating certain aspects of the present disclosure.

DETAILED DESCRIPTION

Figure 2:
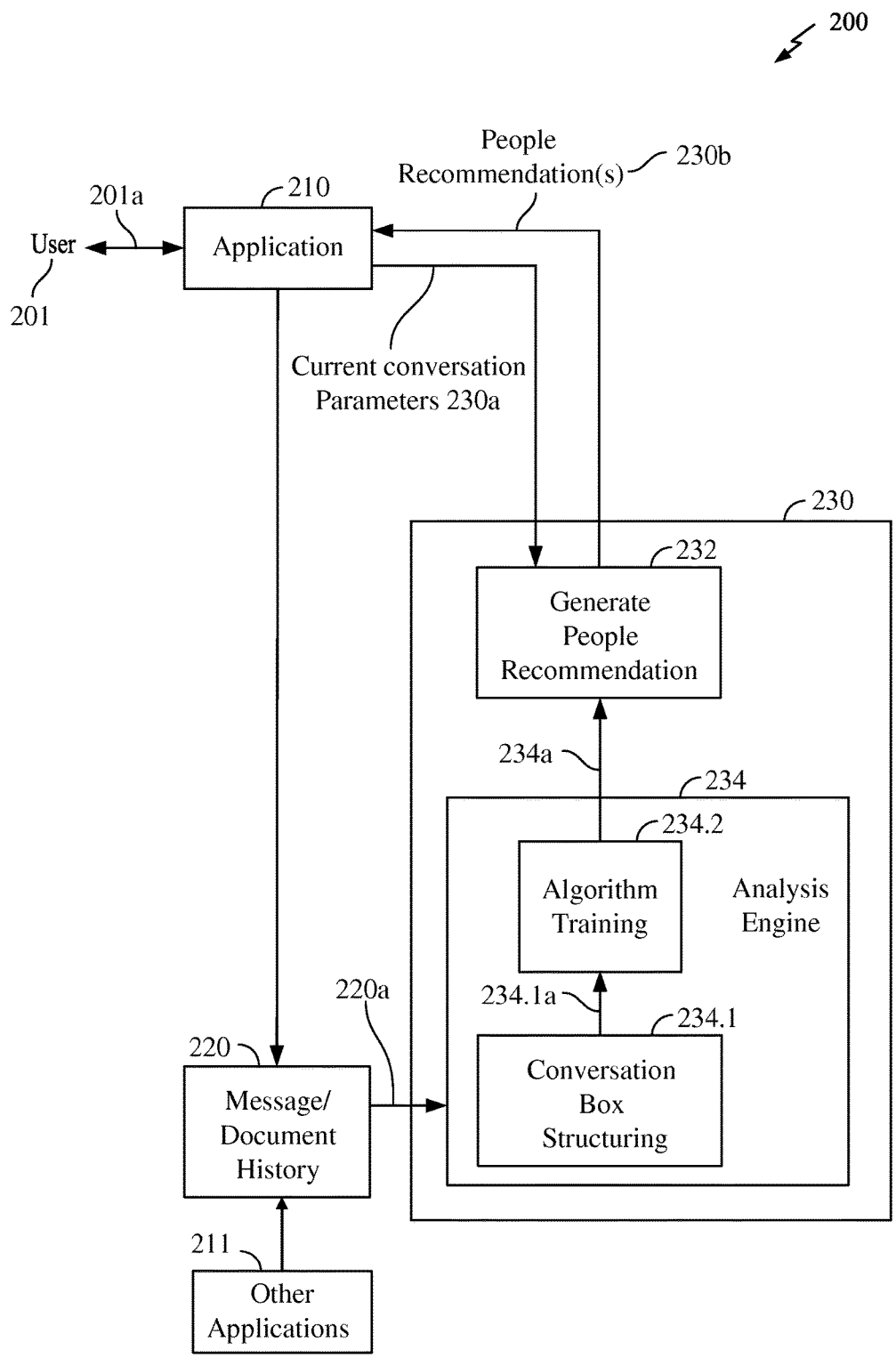
FIG. 2 illustrates an exemplary embodiment of an email recipient recommendation system according to the present disclosure.

Various aspects of the technology described herein are generally directed towards techniques for analyzing prior user communications to derive an algorithm for recommending participants relevant to a current communications item.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. Note the term "conversation box" may also be used interchangeably herein with the term "communications item."

It would be desirable to provide email, document sharing, social networking, and other communications software with the capability to intelligently predict suitable people to recommend to a user based on context. For example, when a user composes email relating to a certain task or project, the email software may intelligently predict people who are most relevant to such task or project, and recommend those people to the user as email recipients. Alternatively, when a user posts on a social networking platform relating to certain content, the software may intelligently predict people who are relevant to such content, and recommend those people to the user to include as recipients. Techniques of the present disclosure advantageously provide a people recommendation system for predicting and recommending relevant people based on user communications history and present context.

Note the term "people" as used herein is not meant to only denote one or more individual persons, but may also be understood to refer to any entity that can be recommended by the system for inclusion in a conversation. Thus mailing lists, social networking groups, etc., will also be understood to fall within the scope of "people" that may be recommended by the system.

FIG. 1 shows an exemplary user interface for an email client software illustrating certain aspects of the present disclosure. In FIG. 1, an email message 100 includes sender field 110, recipient field 112, subject field 114, date and time field 116, and body 120. When a user composes email 100, the email client software (also denoted herein as an example of a "content creation application") may use certain contextual signals, as further described hereinbelow, to recommend one or more recipients or "people recommendations" to the user, e.g., for inclusion in the recipient field 112.

Note FIG. 1 is shown for illustrative purposes only, and is not meant to limit the scope of the present disclosure to email applications, or to any particular types of user interfaces, email clients. Other exemplary embodiments may apply the present techniques to, e.g., people recommendation for meeting invitations, text messages, instant messaging applications, social networking platforms for sharing posts or tweets, other sharing applications, etc.

In an exemplary embodiment, a user composes a document that may be shared with other users. In this case, the present techniques may be used to identify and recommend such other users, based on contextual signals of the document. In an alternative exemplary embodiment, a user may create a meeting invitation to send to other users. In this case, the present techniques may be used to identify and recommend other users to receive the invitation. In yet another alternative exemplary embodiment, a user may share posts or tweets on a social networking platform, and thereby be provided with recommendations of additional people to add based on the content of the posts. Other exemplary embodiments may apply the present techniques to, e.g., people recommendation for text messages, instant messaging applications, video sharing applications, other sharing applications, etc. Such alternative exemplary embodiments are contemplated to be within the scope of the present disclosure.

FIG. 2 illustrates an exemplary embodiment of a people recommendation system 200 for email client software according to the present disclosure. Note FIG. 2 is shown for illustrative purposes only, and is not meant to limit the scope of the present disclosure to any particular types of user interfaces, email clients, or application of the present techniques to email contexts.

In FIG. 2, user 201 provides text or other input 201a (e.g., "user input") through content creation application 210. In an exemplary embodiment, application 210 may correspond to, e.g., an online or offline (locally stored) email client software application for receiving, composing, editing, sending emails, etc. In alternative exemplary embodiments, application 210 may correspond to any application for receiving user input 201a to create a communications item, e.g., word processing software for creating local or shared documents, social networking website user interface, online meeting setup interface, text message or other instant messaging software, or other sharing applications, e.g., as illustratively described hereinabove.

At block 220, user input 201a to application 210, as well as any communications items previously processed through application 210 (e.g., messages received from other people), is cumulatively stored by message/document history block 220 as user history 220a (also generally denoted herein as "a plurality of communications items"). In an exemplary embodiment, history 220a may include one or more data files that include all items cumulatively created or processed by application 210, or other applications 211 (i.e., distinct from application 210).

History 220a may include, e.g., messages (such as emails or messages on a social network) sent and received between the user and other persons, documents (e.g., with or without senders and/or recipients), profile entries, chat conversations (e.g., chat histories), calendar items, meeting requests, agendas, posts or updates on social messaging applications, and/or metadata (e.g., including time/date indicators, location indicators if available, etc.) associated with such items, etc. History 220a may be stored locally, e.g., on a local hard drive, or on a remote server.

In FIG. 2, application 210 further supplies current item parameters 230a from user input 201a to recommendation engine 230. Current item parameters 230a may include, e.g., the content of a communications item (e.g., email item, meeting invitation, social network update, etc.) currently being composed by user 201. In an exemplary embodiment, parameters 230a may further include other contextual signals and metadata of the item being composed, including time of day, current user location, etc. In an exemplary embodiment, information such as required to populate an "s" (source user) field, "c" (context) field, and "T" (recipients) field, as further described hereinbelow with reference to FIG. 3, may be extracted from parameters 230a for a current communications item.

Recommendation engine 230 analyzes parameters 230a and user history 220a to generate people recommendation(s) 230b for the current item. In particular, people recommendation(s) 230b may correspond to one or more additional people or other entities who the user may wish to include as recipient(s) of the current item. In the exemplary embodiment shown, recommendation engine 230 includes a history analysis engine 234, including conversation box structuring block 234.1 and algorithm training block 234.2. Block 234.1 structures user history 220a into a plurality of conversation boxes, as further described hereinbelow with reference to FIG. 3. From the structured conversation boxes, data samples 234.1a are extracted to perform algorithm training at block 234.2. Block 234.2 generates a set of trained algorithm parameters 234a, which is provided to block 232 to generate people recommendations for the current conversation based on parameters 230a.

Figure 3:
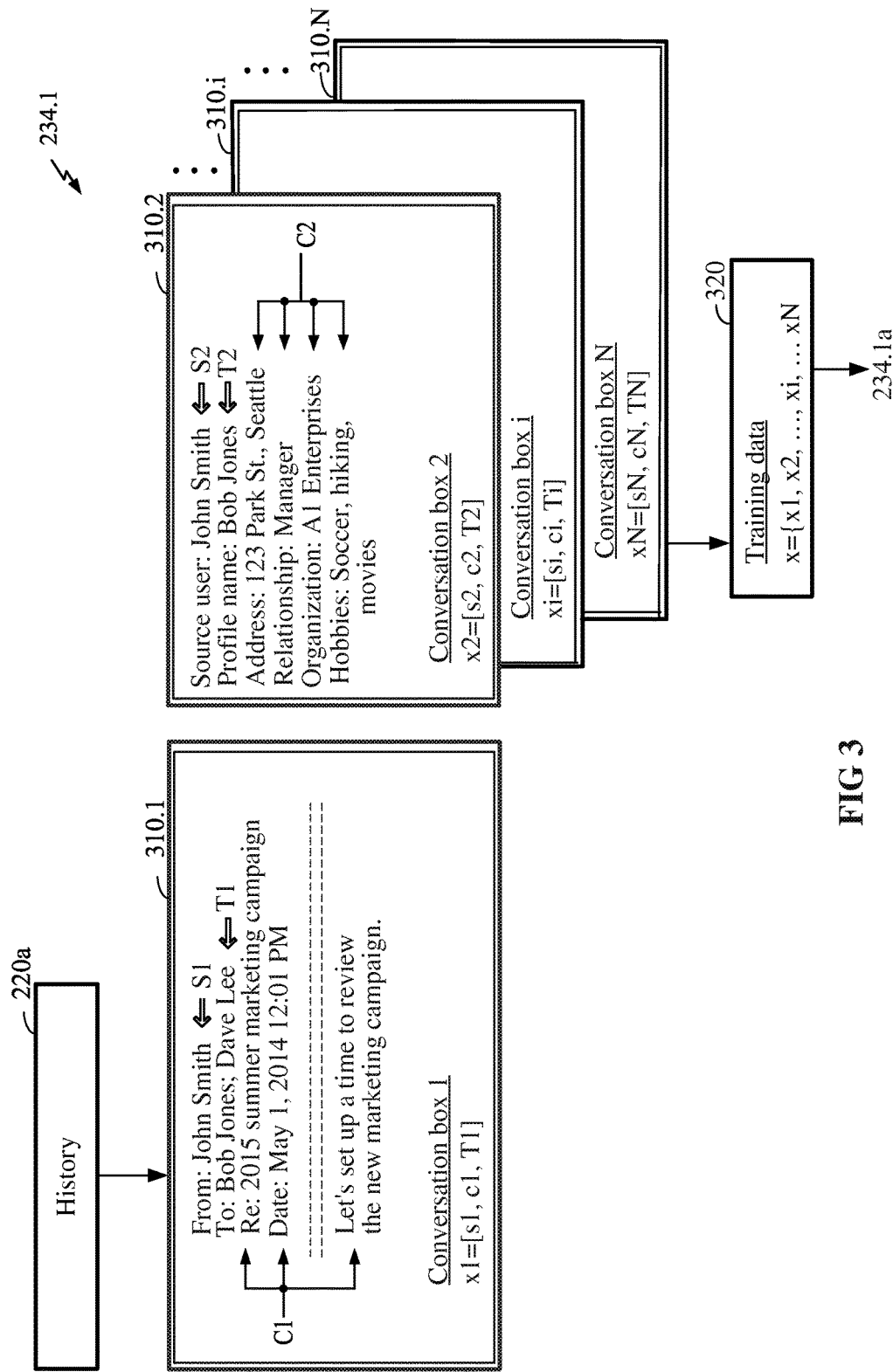
FIG. 3 illustrates operations performed during conversation box structuring described hereinabove.

FIG. 3 illustrates operations performed during conversation box structuring 234.1 described hereinabove. Note while some of the discussion herein may proceed with reference to an exemplary embodiment wherein emails constitute communications items, it will be appreciated that the present techniques may readily be applied to other types of communications items, e.g., meeting invitations, instant messages, message exchanged on social networks, shared documents, posts or updates on social networks, etc. Such alternative exemplary embodiments are contemplated to be within the scope of the present disclosure.

In FIG. 3, user history 220a as earlier described hereinabove may be used during the training phase of a relevant people prediction/recommendation algorithm. In particular, history 220a may be organized as a plurality of conversation boxes 310.1, . . . , 310.$i$, . . . , 310.N, wherein N represents the total number of conversation boxes, and i is an index from 1 to N. Each conversation box 310.i may correspond to, e.g., a communications item used to train the algorithms herein to perform people prediction.

It will be appreciated that conversation boxes may generally include any items from which fields may be extracted for algorithm training, e.g., emails, user profile entries (e.g., a user name, date of birth, age, etc.), non-shared local or online documents, etc. Conversation boxes may also correspond to other types of messages besides emails, e.g., text messages, entries such as online posts or feeds on social network sites, etc.

In an exemplary embodiment, a set of conversation boxes may contain different types of communications items. For example, in FIG. 3, conversation box 310.1 may correspond to an email message, conversation box 310.2 may correspond to a profile entry, conversation box 310.i may correspond to a meeting invitation or a posting on a social network (not shown), etc. Such exemplary embodiments are contemplated to be within the scope of the present disclosure.

For each conversation box, a set of relevant parameters are extracted. In particular, relevant parameters for each conversation box 310.i may be symbolically represented using the variable xi, wherein xi for arbitrary i is also denoted herein as a "vector" or "data sample." For example, x1 corresponds to conversation box 1, xN corresponds to conversation box N, etc. Each data sample xi may further be composed of three different components extracted from conversation box 310.i: si (or "source user"), ci (or "at least one context signal"), and Ti (or "recipient group" or "recipient vector").

In particular, si, or the "source user" set, denotes at least one source user to whom people recommendations are to be provided. For example, conversation box 1 in FIG. 1 corresponds to an email from "John Smith." In this case, s1 may correspond to a representation of "John Smith," who also happens to be the sender of the email message.

ci denotes a contextual feature of the conversation box. For example, in conversation box 1, c1 may correspond to representations of the subject field, content of the body of the email, date, time, the form of Conversation Box 1 as an email, etc. It will be appreciated that the specific content of ci is described herein for illustrative purposes only, and is not meant to limit the scope of the present disclosure to any particular fields that may be extracted from, or any particular representation of the information present in, conversation boxes.

In an exemplary embodiment, ci may be represented as a multi-dimensional "N-gram" representation, wherein ci corresponds to a multi-dimensional vector, and individual dimensions of ci each correspond to specific combinations (e.g., "N-grams") of N letters. For example, in a "3-gram" representation of c1 (i.e., N=3), a dimension of vector c1 corresponding to the three letters "mar" may have a value of 2, corresponding to the two occurrences of "mar" in the email 100 (i.e., once in the subject field 114 and once in the body 120). In alternative exemplary embodiments, individual dimensions of ci may correspond to individual words or word roots, etc.

In an alternative exemplary embodiment, additional or alternative dimensions to the N-gram dimensions may be provided in ci. For example, certain individual dimensions in ci may correspond to the separate content of certain fields or positions within a conversation box, e.g., the subject field 114, the first sentence of body 120, etc. Alternatively or in conjunction, individual dimensions may correspond to, e.g., topic models specifying extracted topics, or semantic symbols corresponding to semantic vectors derived from a deep semantic similarity model (DSSM). In an alternative exemplary embodiment, certain dimensions of ci may correspond to, e.g., explicit text representations of information from the conversation box. Such alternative exemplary embodiments are contemplated to be within the scope of the present disclosure.

Ti, or the "target participants" or "training recipient vector," may indicate a group of one or more participants in the conversation box, excluding those already present in si. For example, in conversation box 1, T1 may correspond to a representation of a group consisting of recipients "Bob Jones" and "Dave Lee."

In an exemplary embodiment, a "recipient-dimensional encoding" representation for Ti may be utilized, wherein Ti is encoded as a sparse binary vector, eg Ti=[0, 0, 0, 1, 0, 0, 1 . . . 0, 0], and wherein each dimension of Ti corresponds to a possible recipient. For example, non-zero (e.g., "1") entries in Ti would correspond to those recipients that are involved in the i-th conversation box. Per the recipient-dimensional encoding representation, the total number T of dimensions of Ti may thus correspond to the total number of contacts in the source user's list of contacts.

Each data sample xi may thus be composed of a concatenation of the corresponding fields si, ci, Ti, and such concatenation may be expressed herein as [si, ci, Ti]. For example, x1=[s1, c1, T1] may express that the data sample corresponding to conversation box 1 or 310.1 includes the concatenation of the fields s1, c1, T1.

As a further example of a conversation box, conversation box 310.2 corresponds to a profile entry for "Bob Jones" in the contact list of source user "John Smith." Accordingly, s2 may correspond to "John Smith," T2 may correspond to "Bob Jones," and c2 may correspond to representations of the parameters in the profile as illustratively shown.

Aggregating over all available conversation boxes 1 to N, or 310.1 to 310.N, produces a series of data samples {x1, . . . , xi, . . . , xN}, which may be collectively denoted as x, also denoted herein as the "aggregated data samples," as indicated at block 320.

In an exemplary embodiment, aggregated data samples x associated with user history 220a may be used to train a neural network-based algorithm for predicting relevant people or entities. In an exemplary embodiment, the algorithm may employ a ranking de-noising auto-encoder technique. Note the techniques described herein are for illustrative purposes only, and are not meant to limit the scope of the present disclosure to any particular techniques for predicting relevant people to a conversation. In alternative exemplary embodiments of the present disclosure, non-neural network-based methods may also be utilized for the purposes described herein.

Figure 4:
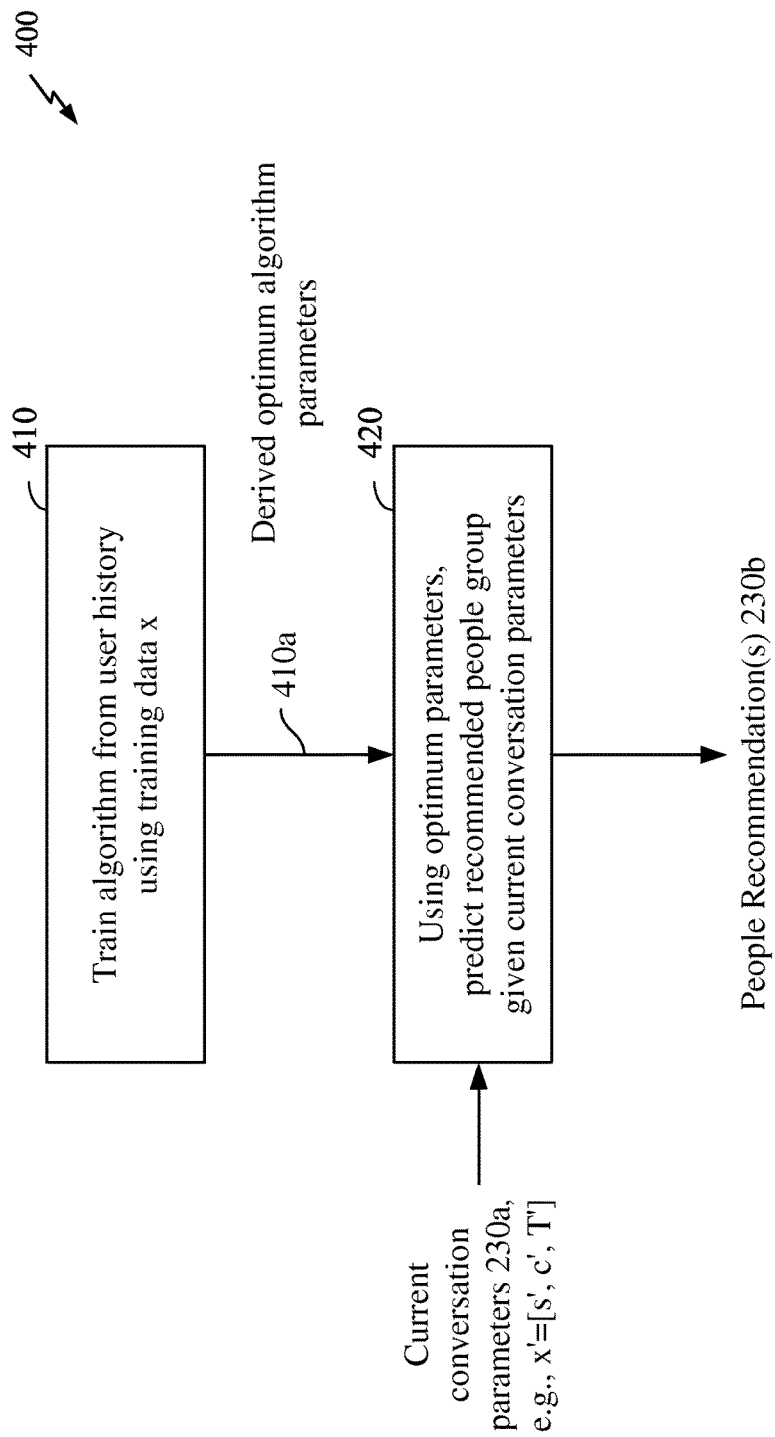
FIG. 4 shows an exemplary embodiment of a method employing training of a machine learning algorithm using user history, and prediction of a recommended people group using the trained algorithm.

FIG. 4 shows an exemplary embodiment 400 of a method employing training of a machine learning algorithm using user history 220a, and prediction of a recommended people group using the trained algorithm. Note FIG. 4 is shown for illustrative purposes only, and is not meant to limit the scope of the present disclosure to any particular exemplary embodiments shown. Note FIG. 4 may also be understood as illustrating an apparatus comprising modules performing the functions shown.

In FIG. 4, at block 410 (also denoted herein as a "training block" or "training phase"), a machine learning algorithm is trained from history 220a using aggregated data samples x={x1, . . . , xi, . . . , xN}, with each data sample xi including the fields si, ci, Ti, as previously described hereinabove. The algorithm training produces a set of optimum algorithm parameters 410a subsequently used by a prediction algorithm.

At block 420 (also denoted herein as a "prediction block" or "prediction phase"), using optimum parameters 410a, people recommendation 230b is generated given current conversation parameters 230a. Current conversation parameters 230a may include fields s', c', T', corresponding to current communications item x'.

Figure 5:
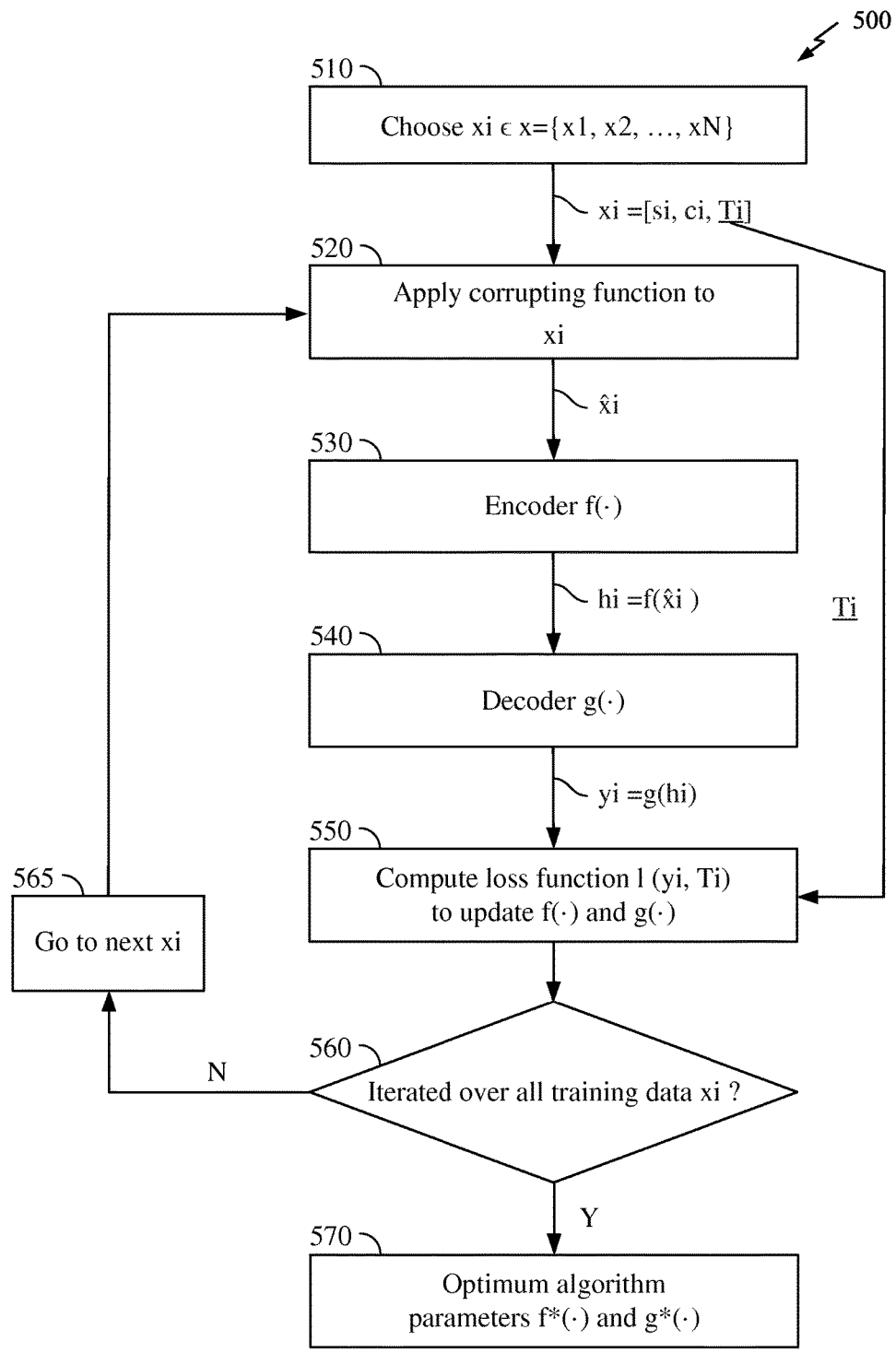
FIG. 5 illustrates an exemplary embodiment of a training phase for the method of FIG. 4.

FIG. 5 illustrates an exemplary embodiment 410.1 of a training phase for method 400. Note method 410.1 is provided for illustrative purposes only, and is not meant to limit the scope of the present disclosure to any particular types of training algorithms shown.

In FIG. 5, at block 510, an initial data sample xi of aggregated data samples x is selected, e.g., corresponding to a single conversation box in user history 220a. Note xi may include, e.g., concatenated fields [si, ci, Ti], as described hereinabove.

At block 520, a corrupting function is applied to data sample xi to generate a corresponding corrupted vector x̂i. The corrupting function acts to corrupt certain elements present in xi, e.g., in a random or deterministic pseudo-random manner. For example, a corrupting function may randomly select binary elements in xi, and flip the selected binary element (e.g., 1 to 0 or 0 to 1).

In an exemplary embodiment, the corrupting function may be applied only to the Ti field (e.g., recipient vector) of xi. A corrupting rate, e.g., 10%-35%, may be associated with the corrupting function, wherein the corrupting rate may be defined as the percentage of bits that are corrupted. Note the corrupting rate may be adjustable depending on different types of data samples used.

In view of the description hereinabove, a corrupting function may be understood to take a "typical" data sample xi, such as may correspond to a conversation box in user history 220a, and "corrupt" the recipient field Ti in a manner so as to emulate the presence of incomplete entries or deviations in the "typical" recipient group. Such incomplete entries or deviations may be, e.g., statistically similar to current conversation parameters 230a received from user 201 during composition of a new communications item, e.g., for which recipients entered by user 201 for the new conversation item may be incomplete or include incorrect recipients (e.g., corresponding to a "corrupted" Ti field). It will be appreciated that an object of training 500 is then to configure the prediction algorithm (e.g., further described hereinbelow with reference to FIG. 6) to optimally suggest the correct recipients based on the parameters (e.g., 230a) of the current communications item.

Following generation of corrupted data sample x̂i, at block 530, an encoder f(•) is applied to x̂i to generate an encoded vector hi=f (x̂i). In an exemplary embodiment, the encoder f(•) may be implemented as, e.g., a weighted summary matrix followed by an activation function. The summary function may include, e.g., an affine transformation, or any other non-linear or linear functions, and the activation function may include, e.g., tan h, sigmoid, etc.

At block 540, vector hi may be decoded using decoder g(•) to generate an output real-valued vector yi=g (hi), wherein yi is also denoted herein as a "estimated relevance group." In an exemplary embodiment, the decoder g(•) may be implemented as, e.g., a weighted summary matrix followed by an activation function.

It will be appreciated that vector yi may generally be designed to contain only elements representing estimates of target participants Ti in xi. For example, in exemplary embodiments, yi need not contain estimates of si and ci fields, as those fields need not be corrupted by the corrupting function at block 520.

At block 550, also denoted herein a "loss function calculation block," yi and (pre-corrupted) field Ti are compared with each other using a loss function, also denoted a reconstruction error function 1 (yi, Ti). In particular, 1 (yi, Ti) may quantify the difference between the output vector yi and the original non-corrupted target participants Ti. It will be appreciated that a goal of updating and/or adjusting weights of the encoder f(•) and the decoder g(•) may be to minimize or otherwise reduce the magnitude of the loss function 1 (yi, Ti), over a suitably broad range of data samples xi.

In an exemplary embodiment, 1 (yi, Ti) may correspond to a squared reconstruction error function (hereinafter "squared-loss function") (Equation 1): 1 (yi, Ti)=$\Sigma$(yi−Ti)$^2$, wherein it will be understood that the summation is to be performed over all dimensions of yi, Ti.

In an alternative exemplary embodiment, 1 (yi, Ti) may correspond to a ranking-based reconstruction loss function utilizing a negative log-likelihood softmax function (hereinafter "ranking-based function") (Equation 2):

$$l(y_i, T_i) = \frac{1}{|T_i|} \sum_{t \in T_i} \log \frac{e^{\lambda y_{i_t}}}{e^{\lambda y_{i_t}} + \sum_{j \notin T_i} e^{\lambda y_{i_j}}}$$

wherein $\lambda$ is a smoothness term for the soft-max function, $$\frac{1}{|T_i|}$$

normalizes for the number of participants in each sample Ti, $y_{i_t}$ indicates the t-th dimension of yi, t∈Ti indicates a non-zero element in Ti (e.g., per the recipient-dimensional encoding representation for Ti), and j∉Ti indicates the zero elements in Ti.

It will be appreciated that a squared-error function may effectively capture a point-wise loss, while a softmax likelihood function may effectively capture a pair-wise loss. In particular, a point-wise function may be used to estimate the absolute score for each single person, while a pair-wise loss may effectively capture the relevant scores for a list of people. For example, in a scenario wherein the Top-N relevant people are to be recommended given a conversation box, a pair-wise function may preferably distinguish the top candidates with greater sensitivity.

Note the ranking-based function may generally correspond to the negative of the summation of the log likelihood of the softmax function, e.g., as summed over all individuals (e.g., non-zero entries) present in Ti. It will be appreciated that using a log likelihood based function may advantageously simplify the computational resources required to calculate Equation 2, as the logarithms are summed, whereas otherwise terms would need to be exponentiated and multiplied.

In an exemplary embodiment, to further simplify the computation of the ranking-based function, the summation in the denominator may be performed over random subsets Zi of the zero elements of Ti, rather than over all zero elements (Equation 3):

$$l(yi, Ti) = \frac{1}{|Ti|} \sum_{t \in Ti} \log \frac{e^{\lambda y_{i_t}}}{e^{\lambda y_{i_t}} + \sum_{z \in Zi} e^{\lambda y_{i_z}}}$$

In an exemplary embodiment, it may be assumed that the zero elements' contribution to the softmax denominator is negligible.

In alternative exemplary embodiments, l (yi, Ti) may generally utilize any function known in the art of reinforcement learning, and such alternative exemplary embodiments are contemplated to be within the scope of the present disclosure. It will be appreciated that the manner in which the encoder/decoder f (•) and g (•) are updated during each iteration will depend on the reconstruction error function chosen.

In an exemplary embodiment, to update weights according to the squared-loss function shown in Equation 1 hereinabove, the following equations (Equations 4) may be used:

$W_H^T = W_H^T - \lambda \alpha_i h_i^T;\ b_T = b_T - \lambda \alpha_i;$ (Equation 4a)

$W_S^T = W_S^T - \lambda \beta_i s_i^T;\ W_C^T = W_C^T - \lambda \beta_i c_i^T;$ (Equation 4b)

$W_T^T = W_T^T - \lambda \beta_i \check{T}_i^T;\ b_H = b_H - \lambda \beta_i;$ (Equation 4c)

$\alpha_i = (yi - Ti) \cdot (1 - yi) \cdot (1 + yi);$ (Equation 4d)

$\beta_i = (W_H \alpha_i) \cdot (1 - h_i) \cdot (1 + h_i);$ (Equation 4e)

wherein $\check{T}_i^T$ represents the corrupted (transposed) version of Ti, and wherein the variables $W_H^T$, $W_S^T$, $W_T^T$, $\alpha_i$, $\beta_i$ are related as follows in an exemplary embodiment (Equations 5):

$f_s(s_i) = W_S^T s_i;\ f_c(c_i) = W_C^T c_i;\ f_T(\check{T}_i) = W_T^T \check{T}_i;$ (Equations 5a)

$f(f_s(s_i), f_c(c_i), f_T(\check{T}_i)) = \text{Tan } h(W_S^T s_i + W_C^T c_i + W_T^T \check{T}_i + b_H);$ (Equation 5b)

$yi = g_K(h_i) = \text{Tan } h(W_H^T h_i + b_T).$ (Equation 5c)

In an alternative exemplary embodiment, to update weights according to the ranking-based function (e.g., Equation 2), the following equations (Equations 6) may be used:

$W_H^T = W_H^T - \lambda \alpha_i h_i^T;\ b_T = b_T - \lambda \alpha_i;$ (Equation 6a)

$W_S^T = W_S^T - \lambda \beta_i s_i^T;\ W_C^T = W_C^T - \lambda \beta_i c_i^T;$ (Equation 6b)

$W_T^T = W_T^T - \lambda \beta_i \check{T}_i^T;\ b_H = b_H - \lambda \beta_i;$ (Equation 6c)

$\alpha_i = \delta \cdot (1 \cdot yi) \cdot (1 + yi);$ (Equation 6d)

$\delta_i = (\delta_{ik})_{k \in T};$ (Equation 6e)

$\delta_{ik} = \begin{cases} \delta_{it}, & k = t \in T_i; \\ \delta_{iz}, & k = z \in Z_i; \\ 0, & \text{else}; \end{cases}$ (Equation 6f)

$\delta_{it} = \frac{\lambda}{|Ti|} \left( \frac{1}{1 + \sum_{z \in Zi} e^{\lambda(y_{i_z} - y_{i_t})}} - 1 \right);$ (Equation 6g)

$\delta_{iz} = \frac{\lambda}{|Ti|} \left( \sum_{t \in Ti} \frac{e^{\lambda(y_{i_z} - y_{i_t})}}{1 + \sum_{z' \in Zi} e^{\lambda(y_{i_{z'}} - y_{i_t})}} \right);$ (Equation 6h)

wherein the exemplary embodiment of Equations 5 may again be used.

Once the weights and bias terms are updated, at block 560, it is checked whether training has been performed using all data samples xi in x. If not, method 500 proceeds to block 565, whereupon training at blocks 520-550 is again performed using the next available data sample xi, e.g., the corrupting and updating are repeated over all the plurality of communications items in the history. If yes, method 500 proceeds to block 570.

In the manner described with reference to blocks 520-550, based on cumulative training of the weights and other bias terms present in f(•) and g(•) using successive data samples in x, an optimal encoding function f*(•) and an optimal decoding function g*(•) are generated. Using these optimal functions, prediction may subsequently be performed to generate a predicted people group y' given an arbitrary input vector x', as further described hereinbelow.

Figure 6:
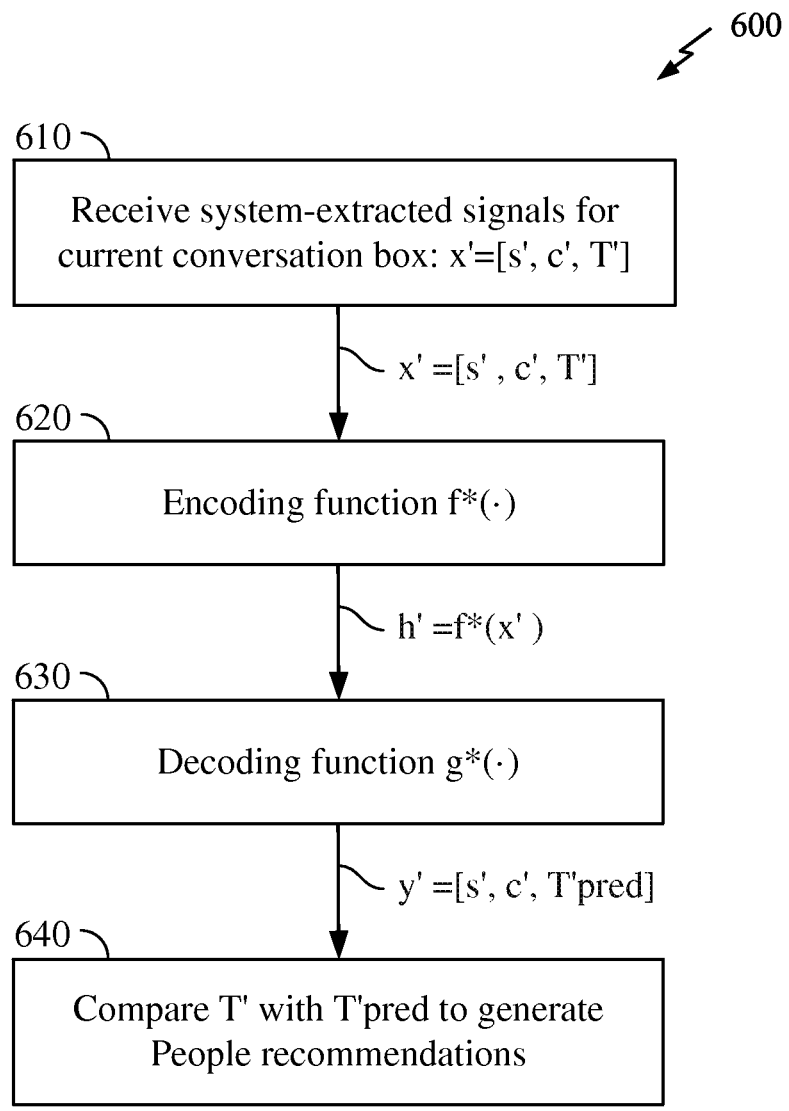
FIG. 6 illustrates an exemplary embodiment of a candidate recipient prediction method according to the present disclosure.

FIG. 6 illustrates an exemplary embodiment of a candidate recipient prediction method 600 according to the present disclosure. Method 600 may also be referred to herein as a "prediction phase."

In FIG. 6, at block 610, system-extracted signals x' for a current conversation box are received. In particular, x' may include a concatenation of s', c', and T' fields, as previously described hereinabove with reference to FIG. 3, but extracted for a current communications item. Note T' (also denoted herein as the "pre-specified recipient group") may correspond to the people group already specified in x', e.g., a partial list of recipients already specified by the user composing the current conversation box. Based on knowledge of T', it will be an object of method 600 to predict any other likely recipients of the current conversation box not already present in T'.

At block 620, x' is encoded using an encoding function f*(•) to generate an encoded vector h'. Note encoding may generally proceed similarly as described with reference to block 530 described hereinabove with reference to data sample xi of the user history.

At block 630, h' is passed to decoding function g*(•) to generate y'=g*(h'). It will be noted that y' contains a field T'pred, also denoted herein as a "relevance group," corresponding to the predicted recipients of the current conversation box.

At block 640, T' (the people group already specified in x') is compared to y', in particular, the T'pred component of y', to suggest a recipient to the user. Based on this comparison, there may be a set of additional people T'new not already present in T', wherein T'new is also described as T'pred−(T'pred ∩ T'). To determine which of the additional people in T'new is to be recommended as the one or more top recommendations, ranking may further be performed as described with reference to FIG. 7 described hereinbelow.

Figure 7:
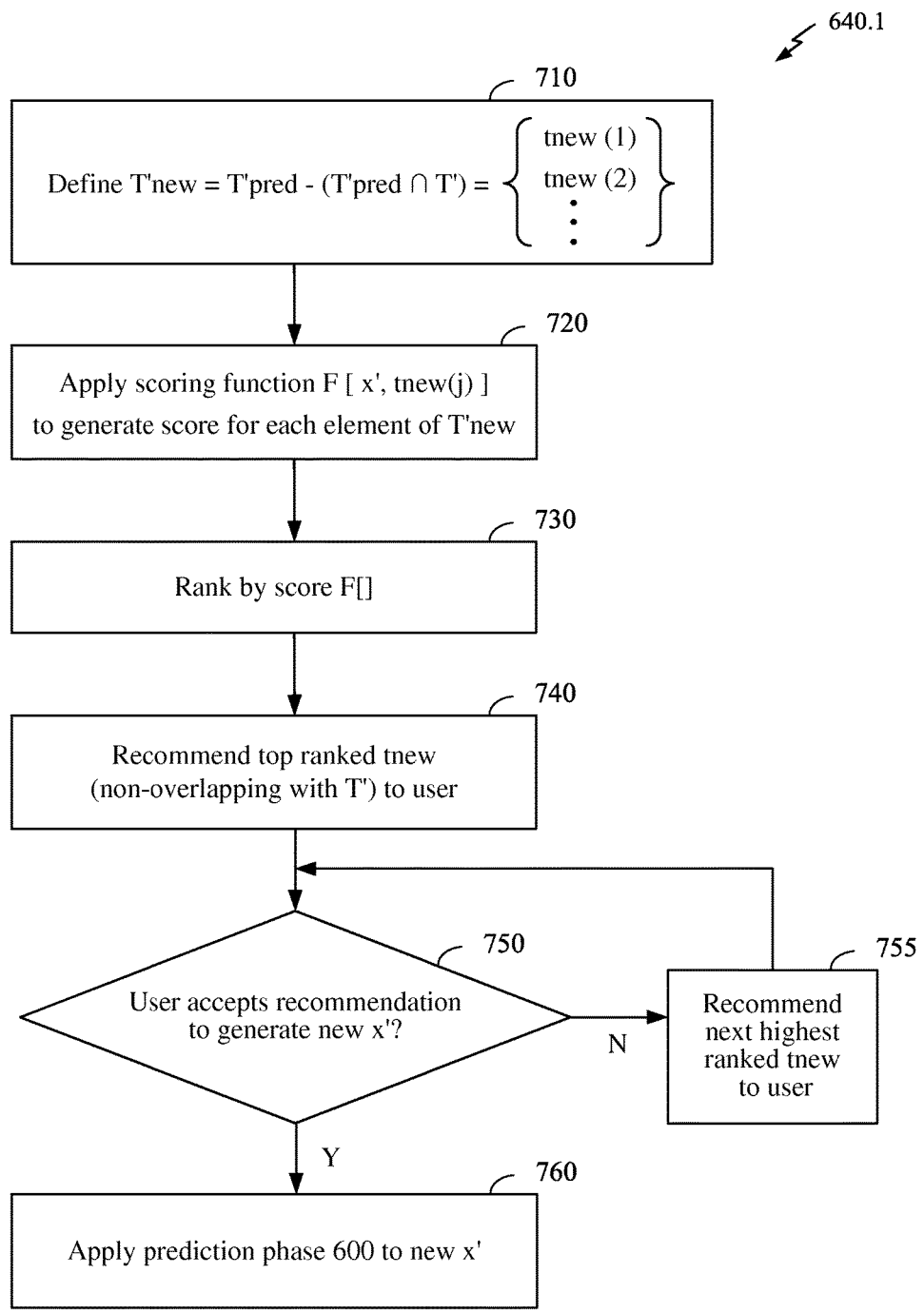
FIG. 7 illustrates an exemplary embodiment of a block for ranking and suggesting a recipient to the user.

FIG. 7 illustrates an exemplary embodiment 640.1 of block 640 for ranking and suggesting a recipient to the user. Note embodiment 640.1 is shown for illustrative purposes only, and is not meant to limit the scope of the present disclosure.

In FIG. 7, at block 710, T'new is shown as including individual persons or entities tnew(1), tnew(2), etc. Such individual persons or entities may correspond to members of the relevance group not in the pre-specified recipient group. Note in the case where T' new includes only one person, ranking need not be performed.

At block 720, a scoring function F[x', tnew(j)] is applied to each person tnew(j), where j indexes the individual persons or entities in T' new. In an exemplary embodiment, the scoring function F[•] may correspond to the following (Equation 7):

$h = \text{Tan } h(W_S^T s + W_C^T c + W_T^T T + b_H);$ (Equation 7a)

$F[x', t_{new}] = (W_H^T h)_{t_{new}} + (b_T)_{t_{new}}$ (Equation 7b)

At block 730, the individuals are ranked according to their score F[•].

At block 740, an individual person or entity associated with the top-ranked score may be recommended to the user.

At block 750, it is determined whether the user accepts the recommendation(s) provided at block 740. It is noted that user acceptance of a recommendation automatically generates a new x', whereby the new x' includes an updated T' field incorporating the accepted tnew. If yes (user accepts recommendation), then method 640.1 proceeds to block 760. If no, method 640.1 proceeds to block 755.

At block 755, the next highest ranked tnew may be recommended to the user. Following block 755, it may then be determined again whether the user accepts the recommendation, at block 750.

At block 760, the new x' may be input to another iteration of prediction phase 300 to generate new people recommendation(s).

In an exemplary embodiment, depending on whether a user accepts or rejects a recipient recommendation, such information may be used to re-train the de-noising auto-encoding algorithms described hereinabove, e.g., with reference to FIGS. 4-5. In particular, the accepted or rejected (or otherwise user-specified) recipient recommendation may be used to generate a new recipient field T for a new data sample x, and training as described hereinabove with reference to block 410 of FIG. 4 or training 500 of FIG. 5 may be repeated to derive new weights for the encoding and decoding functions. Such alternative exemplary embodiments are contemplated to be within the scope of the present disclosure.

Figure 8:
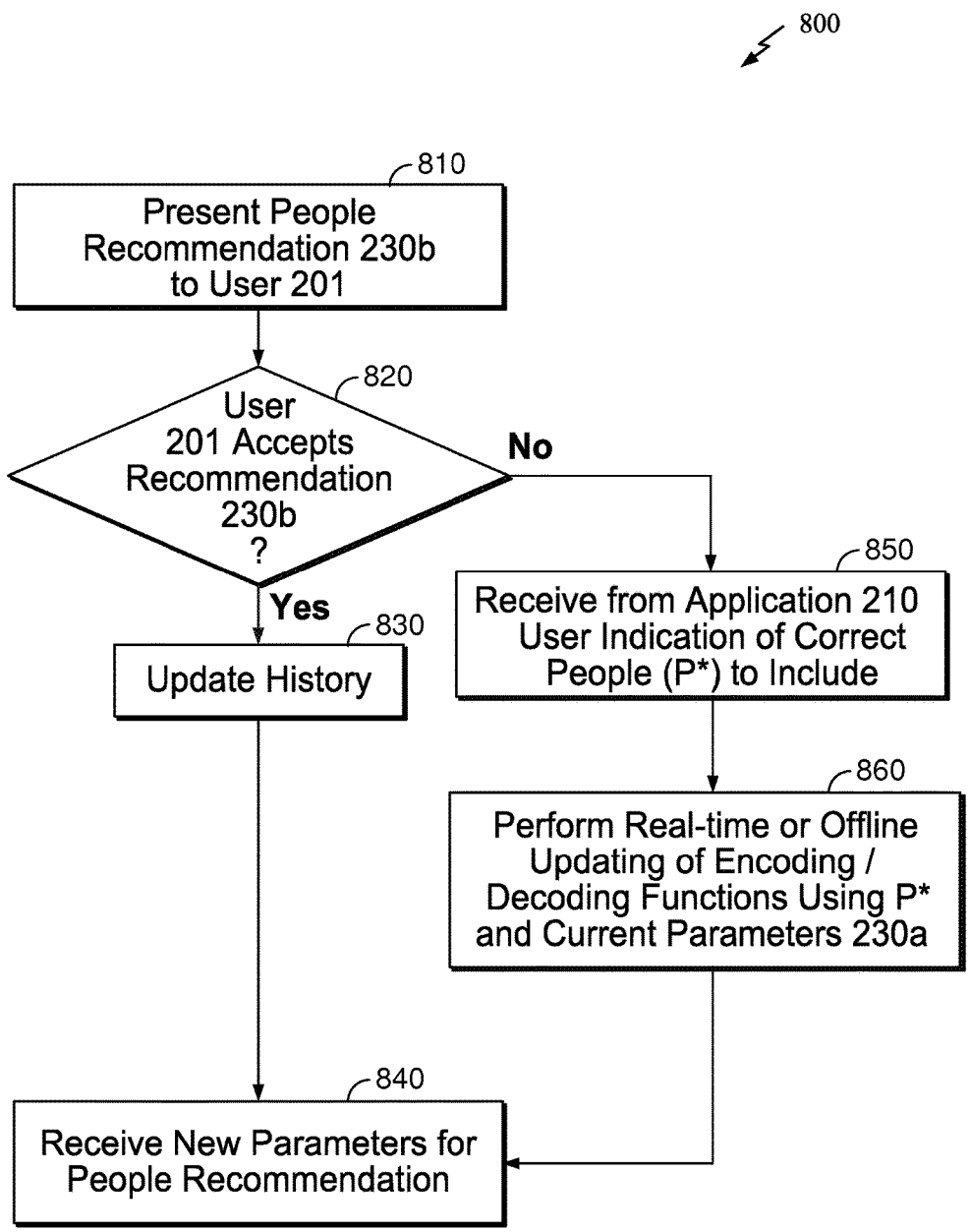
FIG. 8 illustrates an exemplary embodiment of a method for performing system update and feedback according to the present disclosure.

FIG. 8 illustrates an exemplary embodiment 800 of a method for performing system update and feedback according to the present disclosure.

In FIG. 8, at block 810, system 200 presents people recommendation 230b to user 201.

At block 820, it is determined whether user 201 accepts recommendation 230b or not. If yes, the method 800 proceeds to block 830. If no, the method 800 proceeds to block 840.

At block 830, as recommendation 230b is accepted by user 201, user history 220a is updated, and new parameters 230a for a next people recommendation may be received.

Alternatively, at block 840, as recommendation 230b is not accepted by user 201, method 800 will receive information from application 210 regarding the correct people (P*) to include for the current content parameters 230a, e.g., as indicated directly by the user. For example, in certain instances, system 200 may recommend a candidate recipient (230b) for an email (230a) being composed by user 201, and user 201 may reject the candidate recipient. User 201 may instead choose an alternative recipient (P*) as the correct recipient.

At block 860, based on the indication of the correct recipient (P*) as indicated by user 201, system 200 may perform real-time updating or training of system parameters using the data set defined by P* and current parameters 230a. In an exemplary embodiment, such updating or training may correspond to training the encoding and decoding functions f*(•) and g*(•) by defining a new data sample x*, wherein the T component of x* accounts for the indication of the correct recipient P* as indicated by user 201 at block 850.

Figure 9:
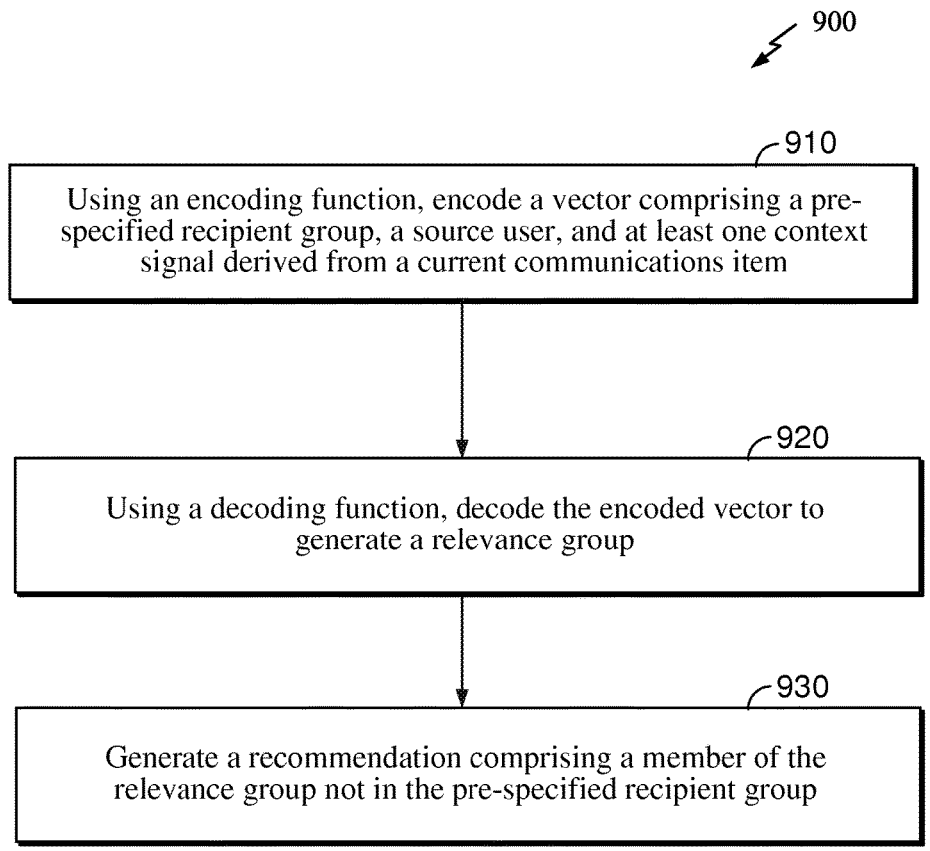
FIG. 9 illustrates an exemplary embodiment of a method according to the present disclosure.

FIG. 9 illustrates an exemplary embodiment 900 of a method according to the present disclosure. Note FIG. 9 is shown for illustrative purposes only, and is not meant to limit the scope of the present disclosure.

In FIG. 9, at block 910, using an encoding function, a vector is encoded comprising a pre-specified recipient group, a source user, and at least one context signal derived from a current communications item.

At block 920, using a decoding function, the encoded vector is decoded to generate a relevance group.

At block 930, a recommendation is generated comprising a member of the relevance group not in the pre-specified recipient group.

Figure 10:
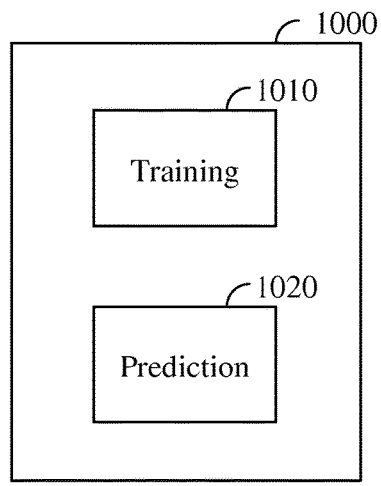
FIG. 10 illustrates an exemplary embodiment of an apparatus according to the present disclosure.

FIG. 10 illustrates an exemplary embodiment 1000 of an apparatus according to the present disclosure. Note FIG. 9 is shown for illustrative purposes only, and is not meant to limit the scope of the present disclosure.

In FIG. 10, apparatus 1000 includes a training block 1010 configured to train an encoding function and a decoding function using a plurality of communications items. Apparatus 1000 further includes a prediction block 1020 configured to generate a recipient recommendation using the encoding function to encode a vector comprising a pre-specified recipient group, a source user, and at least one context signal derived from a current communications item. The prediction block 1020 is further configured to generate the recipient using the decoding function to decode the encoded vector to generate a relevance group, wherein the recipient recommendation comprises a member of the relevance group not in the pre-specified recipient group.

Figure 11:
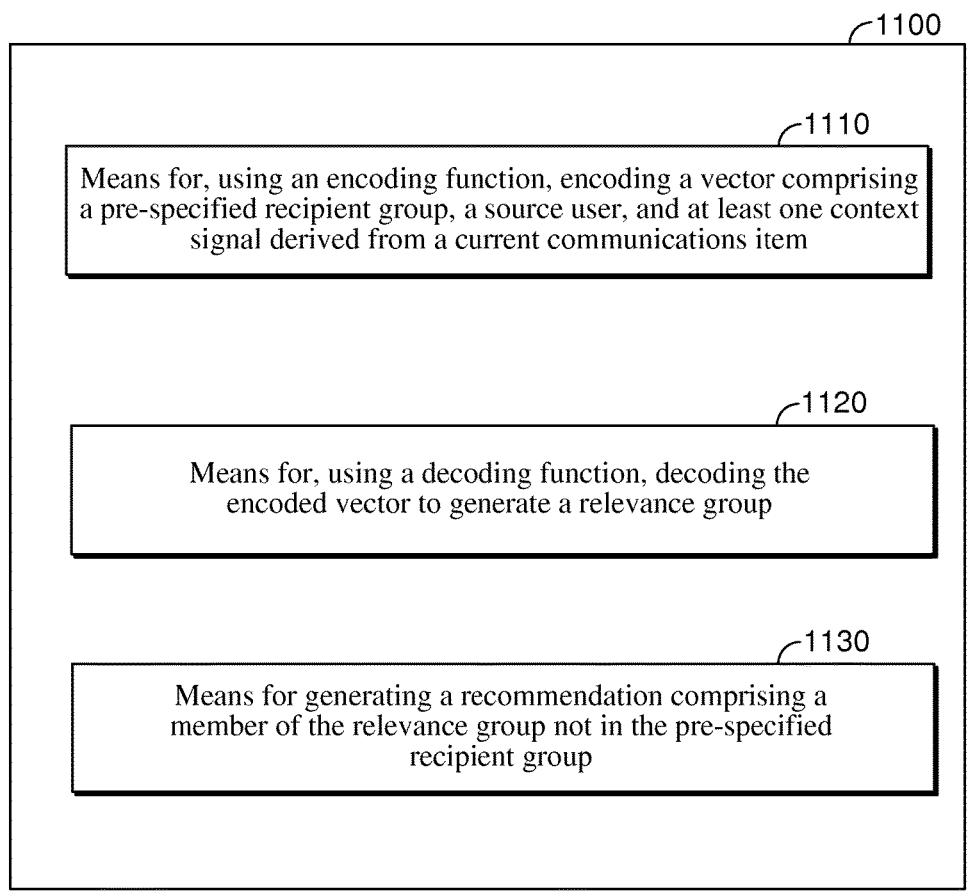
FIG. 11 illustrates an alternative exemplary embodiment of an apparatus according to the present disclosure.

FIG. 11 illustrates an alternative exemplary embodiment 1100 of an apparatus according to the present disclosure. Note FIG. 11 is shown for illustrative purposes only, and is not meant to limit the scope of the present disclosure.

In FIG. 11, apparatus 1100 includes means 1110 for encoding a vector comprising a pre-specified recipient group, a source user, and at least one context signal derived from a communications item, means 1120 for decoding the encoded vector to generate a relevance group, and means 1130 for generating a recommendation comprising a member of the relevance group not in the pre-specified recipient group.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method for execution by a computer processor coupled to a memory, the method comprising:
using an encoding function, encoding a vector comprising a pre-specified recipient group, a source user, and at least one context signal derived from a current communications item;
using a decoding function, decoding the encoded vector to generate a relevance group;
generating a recommendation comprising a member of the relevance group not in the pre-specified recipient group; and
training said encoding and decoding functions using a de-noising auto-encoder neural network model applied to a plurality of historical communications items, each of said plurality of historical communications items being associated with a data sample comprising a recipient group, a source user, and at least one context signal from the item;
said training comprising, for each data sample:
applying a corrupting function to the recipient group of the data sample to corrupt the recipient group of the data sample and generate a corrupted vector;
encoding the corrupted vector to generate an encoded training vector to extract features of the corrupted vector;
decoding the encoded training vector to generate a target recipient group corresponding to an estimate of the recipient group;
computing a loss function for the data sample based on the difference between the target recipient group and the recipient group; and
updating parameters of the encoding and decoding functions using the computed loss function for the data sample.

2. The method of claim 1, the training comprising: updating one or more weights in the encoding function to minimize a ranking based reconstruction loss function comprising a log-likelihood computation.

3. The method of claim 1, the training further comprising: updating one or more weights in the decoding function to minimize a ranking based reconstruction loss function comprising a log-likelihood computation.

4. The method of claim 1, the training comprising: extracting a recipient vector and a context vector corresponding to each of the plurality of communications items; and corrupting at least one element of the recipient vector.

5. The method of claim 1, wherein the pre-specified recipient group is represented using a sparse binary vector, and wherein the at least one context signal is represented using a multi-dimensional vector comprising a plurality of dimensions corresponding to occurrences of N-grams.

6. The method of claim 1, wherein the at least one context signal is represented using a multi-dimensional vector comprising a plurality of dimensions corresponding to semantic symbols or extracted topics.

7. The method of claim 1, further comprising assigning scores to members of the relevance group using a scoring function, the generating the recommendation comprising selecting a member of the relevance group having a highest score.

8. The method of claim 1, the recommendation comprising a recommendation to add a recipient to an email.

9. An apparatus comprising a processor and a memory coupled to the processor, the memory storing instructions for causing the processor for executing:
a training block configured to train an encoding function and a decoding function using a plurality of historical communications items; and
a prediction block configured to generate a recipient recommendation using the encoding function to encode a vector comprising a pre-specified recipient group, a source user, and at least one context signal derived from a current communications item, and further using the decoding function to decode the encoded vector to generate a relevance group, wherein the recipient recommendation comprises a member of the relevance group not in the pre-specified recipient group;
the training block configured to train the encoding and decoding functions using a de-noising auto-encoder neural network model applied to the plurality of historical communications items, each of said plurality of historical communications items being associated with a data sample comprising a recipient group, a source user, and at least one context signal from the item, the training block configured to, for each data sample:
apply a corrupting function to the recipient group of the data sample to corrupt the recipient group of the data sample and generate a corrupted vector;
using the encoding function, encode the corrupted vector to generate an encoded training vector to extract features of the corrupted vector;
using the decoding function, decode the encoded training vector to generate a target recipient group corresponding to an estimate of the recipient group;
compute a loss function for the data sample based on the difference between the target recipient group and the recipient group; and
update parameters of the encoding and decoding functions using the computed loss function for the data sample.

10. The apparatus of claim 9, wherein the vector comprises a representation of the pre-specified recipient group as a sparse binary vector, and a representation of the at least one context signal as a multi-dimensional N-gram vector.

11. The apparatus of claim 9, wherein the vector comprises a representation of the at least one context signal as a multi-dimensional bag of words vector or as a multi-dimensional semantic symbol vector.

12. The apparatus of claim 9, further comprising a recommendation block configured to:
apply a scoring function to generate a score for each member of the relevance group not in the pre-specified recipient group;
generate the recipient recommendation as the scored member having the highest score.

13. The apparatus of claim 12, the recommendation block further configured to receive an acceptance or rejection by a user of the recipient recommendation, the prediction block further configured to generate the recipient recommendation using the encoding function to encode a second vector comprising a second pre-specified recipient group based on the acceptance or rejection, the source user, and the at least one context signal.

14. The apparatus of claim 9, the loss function comprising a squared-loss function.

15. The apparatus of claim 9, the loss function comprising a ranking-based function.

16. An apparatus comprising computer hardware configurable to execute:

means for, using an encoding function, encoding a vector comprising a pre-specified recipient group, a source user, and at least one context signal derived from a communications item;

means for, using a decoding function, decoding the encoded vector to generate a relevance group;

means for generating a recommendation comprising a member of the relevance group not in the pre-specified recipient group; and means for training the encoding and decoding functions using a de-noising auto-encoder neural network model applied to a plurality of historical communications items, each of said plurality of historical communications items being associated with a data sample comprising a recipient group, a source user, and at least one context signal from the item;

said means for training comprising:

means for, for each data sample, applying a corrupting function to the recipient group of the data sample to corrupt the recipient group of the data sample and generate a corrupted vector;

means for encoding the corrupted vector to generate an encoded training vector to extract features of the corrupted vector;

means for decoding the encoded training vector to generate a target recipient group corresponding to an estimate of the recipient group;

means for computing a loss function for the data sample based on the difference between the target recipient group and the recipient group; and means for updating parameters of the encoding and decoding using the computed loss function for each data sample.

* * * * *